US007251702B2

(12) United States Patent
Lee et al.

(10) Patent No.: US 7,251,702 B2
(45) Date of Patent: Jul. 31, 2007

(54) NETWORK CONTROLLER AND METHOD OF CONTROLLING TRANSMITTING AND RECEIVING BUFFERS OF THE SAME

(75) Inventors: Myeong-Jin Lee, Anyang (KR); Jong-hoon Shin, Yongin (KR); Min-joung Lee, Suwon (KR)

(73) Assignee: Samsung Electronics Co., Ltd. (KR)

( * ) Notice: Subject to any disclaimer, the term of this patent is extended or adjusted under 35 U.S.C. 154(b) by 89 days.

(21) Appl. No.: 10/614,951

(22) Filed: Jul. 8, 2003

(65) Prior Publication Data

US 2004/0027990 A1 Feb. 12, 2004

(30) Foreign Application Priority Data

Jul. 25, 2002 (KR) ...................... 10-2002-0043896

(51) Int. Cl.
- *G06F 13/14* (2006.01)
- *G06F 13/00* (2006.01)
- *G06F 13/368* (2006.01)
- *G06F 13/38* (2006.01)

(52) U.S. Cl. .................. 710/240; 710/29; 710/36; 710/39; 710/40; 710/41; 710/52; 710/53; 710/56; 710/57; 710/107; 710/112; 710/119; 710/123; 710/241; 710/242; 710/244; 710/309; 710/310

(58) Field of Classification Search .................. 710/29, 710/36, 39, 40, 41, 52, 53, 56, 57, 107, 112, 710/119, 123, 240, 241, 242, 244, 31, 43, 710/58, 62–64, 72, 113, 305, 309, 310; 709/225, 709/227, 232, 200, 243, 234, 235; 370/229; 375/219, 220

See application file for complete search history.

(56) References Cited

U.S. PATENT DOCUMENTS

| | | | | |
|---|---|---|---|---|
| 4,942,553 A | * | 7/1990 | Dalrymple et al. ........... 710/57 |
| 5,377,184 A | * | 12/1994 | Beal et al. ................... 370/231 |
| 5,440,691 A | * | 8/1995 | Carrafiello et al. ......... 706/234 |
| 5,448,701 A | | 9/1995 | Metz, Jr. et al. ............ 395/293 |
| 5,546,543 A | * | 8/1996 | Yang et al. .................. 709/235 |
| 5,771,356 A | * | 6/1998 | Leger et al. ................. 709/233 |
| 5,796,961 A | * | 8/1998 | O'Brien ...................... 710/107 |
| 5,802,153 A | * | 9/1998 | Sridhar et al. .............. 375/220 |

(Continued)

FOREIGN PATENT DOCUMENTS

JP  6-261052  9/1994

*Primary Examiner*—Tanh Q. Nguyen
(74) *Attorney, Agent, or Firm*—Mills & Onello LLP (57) ABSTRACT

In a method of controlling transmitting and receiving buffers of a network controller and a network controller operating under such a method, at least one request for access to a system bus from the transmitting buffer and the receiving buffer is received, and the occupancy level of data in the receiving buffer and the vacancy level of data in the transmitting buffer are determined. Access to the system bus is granted based on the determination result. Buffers in the transmitting and receiving paths are treated as a single virtual transmitting buffer and a single virtual receiving buffer, respectively. Bus priority is determined by the data occupancy level in each virtual buffer and any change in the occupancy level. Therefore, it is possible to prevent or reduce underflow of the transmitting buffer and overflow of the receiving buffer, thereby impartially arbitrating which of the buffers can access the memory.

9 Claims, 4 Drawing Sheets

U.S. PATENT DOCUMENTS

| | | | |
|---|---|---|---|
| 5,904,732 A * | 5/1999 | Greenley et al. | 710/57 |
| 5,933,413 A * | 8/1999 | Merchant et al. | 370/234 |
| 6,014,722 A * | 1/2000 | Rudin et al. | 710/240 |
| 6,067,408 A * | 5/2000 | Runaldue et al. | 710/307 |
| 6,397,287 B1 * | 5/2002 | Brown et al. | 710/305 |
| 6,832,280 B2 * | 12/2004 | Malik et al. | 710/200 |
| 6,907,048 B1 * | 6/2005 | Treadaway et al. | 370/474 |
| 2003/0026277 A1 * | 2/2003 | Pate et al. | 370/412 |

* cited by examiner

NETWORK CONTROLLER AND METHOD OF CONTROLLING TRANSMITTING AND RECEIVING BUFFERS OF THE SAME

BACKGROUND OF THE INVENTION

This application claims the priority of Korean Patent Application No. 2002-43896, filed 25 Jul. 2002 in the Korean Intellectual Property Office (KIPO), which is incorporated herein in its entirety by reference.

1. Field of the Invention

The present invention relates to an Ethernet network controller, and more particularly, to a network controller and a method of controlling transmitting and receiving buffers of the same.

2. Description of the Related Art

Figure 1:
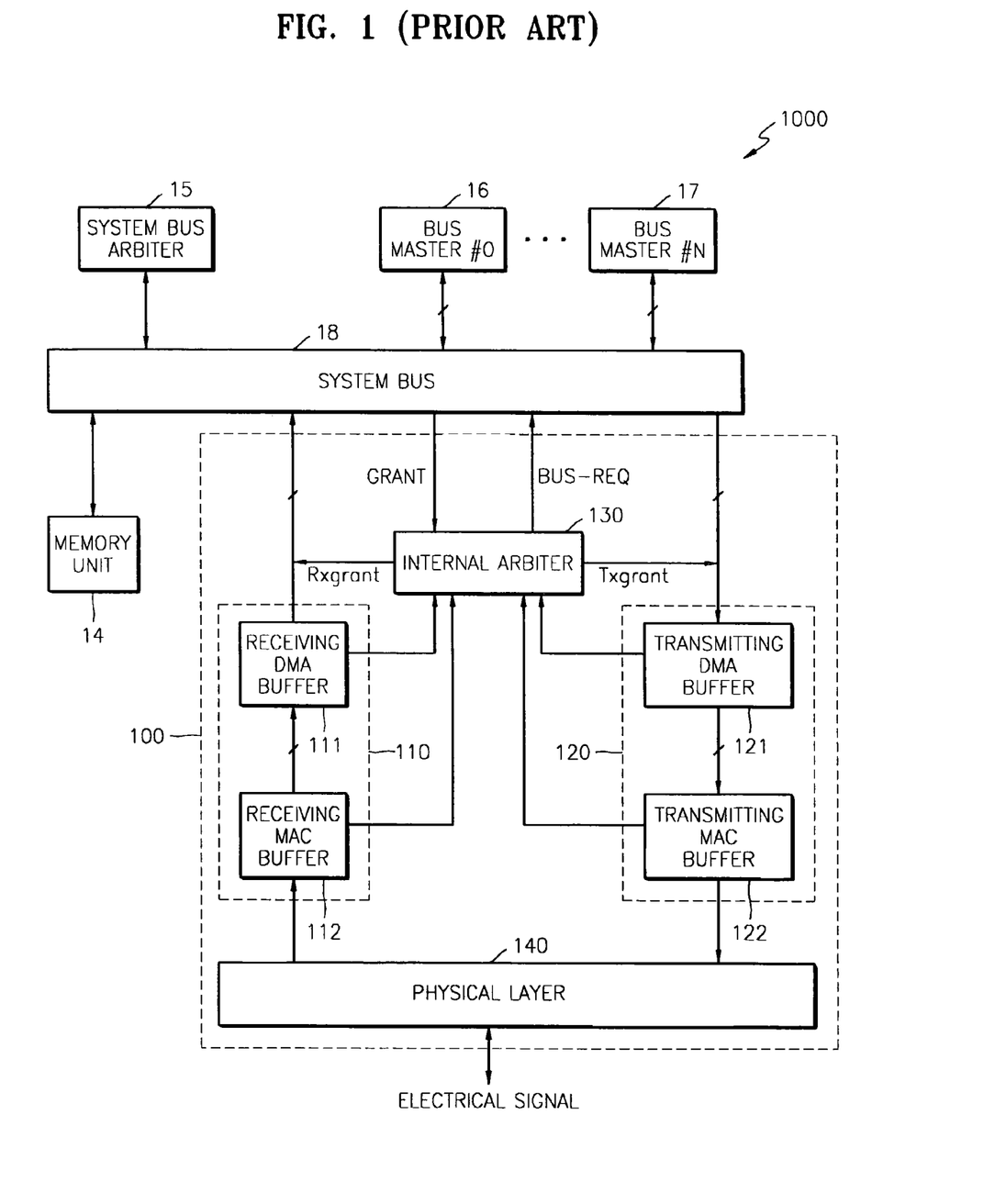
FIG. 1 is a block diagram of a conventional computer system having a full-duplex Ethernet network controller.

Network controllers commonly include a media access controller (MAC) that functions as an interface between the network controller and a network, and a direct memory access (DMA) controller that functions as an interface between the network controller and a system. In particular, a network controller, such as an Ethernet controller, that adopts a full duplex mode is illustrated in the computer system of FIG. 1. Referring to FIG. 1, the computer system 1000 includes a network controller 100, a memory unit 14, a system bus 18, a plurality of bus masters 16 and 17, and a system bus arbiter 15. The memory unit 14, the system bus arbiter 15, the plurality of bus masters 16 and 17, and the network controller 100 are connected to the system bus 18.

The system bus arbiter 15 arbitrates use of the system bus 18 between a plurality of bus masters 16 and 17 and the network controller 100. The plurality of bus masters 15 and 16 may be interfaced to peripheral devices, such as devices involving the reading and writing data, for example, when driving a sound card or a universal serial bus (USB).

The network controller 100 includes a transmission path for transmitting data and a receiving path for receiving data. A receiving DMA buffer 111 and a receiving MAC buffer 112 and a transmitting DMA buffer 121 and a transmitting MAC buffer 122 are installed in the receiving path and the transmission path, respectively. A single DMA controller provides an interface between each MAC and the system bus 18. In this manner, the transmitting and receiving modules can independently access the system bus 18. For this reason, the computer system 1000 requires an internal arbiter 130 that arbitrates access to the system bus 18.

The internal arbiter 130 receives a request signal Rxreq or Txreq for requesting access to the system bus 18 from the receiving and transmitting modules, transmits this request to the system bus arbiter 15 via the system bus 18, receives a grant GRANT to permit access to the system bus 18 from the system bus arbiter 15, and forwards the grant GRANT to a receiving unit 110 or a transmitting unit 120 via the system bus 18. When the transmitting unit 110 or the receiving unit 120 is permitted access to the system bus 18, data is read from the memory unit 14 and a certain electrical signal is output via the physical layer 140. Otherwise, an electrical signal received via the physical layer 140 is converted and written as data to the memory unit 14.

In this case, the internal arbiter 130 is required to prevent or reduce underflow of the transmitting buffers 121 and 122 or overflow of the receiving buffers 111 and 112, in consideration of the occupancy levels of several buffers, i.e., the transmitting DMA buffer 121, the transmitting MAC buffer 122, the receiving DMA buffer 111, and the receiving MAC buffer 112, which are present at the transmitting and receiving paths of the MAC and DMA, as shown in FIG. 1.

Since data stored in the transmitting DMA buffer 121 is transmitted to the transmitting MAC buffer 122, underflow of the transmitting MAC buffer 122 reduces the performance of the transmitting unit 120. Accordingly, if the transmitting MAC buffer 122 is not empty, underflow of the transmitting DMA buffer 121 does not cause a serious problem during transmission of data. Similarly, since data in the receiving MAC buffer 112 is transmitted to the receiving DMA buffer 111, an overflow, which causes a loss of data, can be easily caused in the receiving DMA buffer 111.

In general, the respective sizes of the internal buffers of a network controller can be set differently according to the application or system of the network controller. If the sizes of the internal buffers are small, the occupancy level of data in each buffer may suddenly change depending on the occupancy of a bus occupied by other masters or a temporal change in the receiving rate of a network may occur.

Also, if the occupancy level of data in a buffer is controlled only in consideration of an absolute occupancy level of a buffer at the transmitting and receiving paths, it is difficult to arbitrate access to data between devices at the transmitting and receiving paths, and thus, overflow or underflow of transmitting and receiving buffers cannot be prevented or reduced.

SUMMARY OF THE INVENTION

The present invention provides a method of controlling a buffer, in which buffers in a transmitting path and buffers in a receiving path are treated as a single transmitting buffer and a single receiving buffer, respectively, and the relative occupancy levels of the respective virtual buffers and increases or decreases in the occupancy levels are considered when controlling these buffers.

The present invention also provides a network controller performing such a method of controlling a buffer.

According to one aspect of the present invention, there is provided a method of controlling at least one of a transmitting buffer and a receiving buffer of a network controller. At least one request for access of a system bus from the transmitting buffer and the receiving buffer is received. A vacancy level of data in the transmitting buffer and an occupancy level of data in the receiving buffer is determined, and access to the system bus by the transmitting buffer or the receiving buffer is granted based on the determination result.

In one embodiment, access is granted to the system bus by receiving the request for access to the system bus from one of the transmitting and receiving buffers and granting access to the system bus to the one of the transmitting and receiving buffers sending the request.

In another embodiment, access is granted to the system bus by determining a present operational state as an emergency mode when both the transmitting and receiving buffers request access to the system bus, the occupancy level of the receiving buffer is higher than a threshold occupancy level of the receiving buffer, and the vacancy level of transmitting buffer is higher than a threshold vacancy level of the transmitting buffer; and comparing the occupancy level of data in the receiving buffer with the vacancy level of data in the transmitting buffer based on the determination result, and granting access to the system bus by one of the transmitting buffer or the receiving buffer based on the determination result.

When the present operational state does not correspond to the emergency mode, the occupancy level of the receiving buffer is compared with the vacancy level of the transmitting buffer, and one of the transmitting and receiving buffers is granted access to the system bus, and the receiving buffer is granted access to the system bus when the occupancy level of the receiving buffer is higher than the vacancy level of the transmitting buffer, and the transmitting buffer is granted access to the system bus when the vacancy level of the transmitting buffer is higher than the occupancy level of the receiving buffer.

When the present operational state corresponds to the emergency mode, the occupancy level of the receiving buffer is compared with the vacancy level of the transmitting buffer, and one of the transmitting and receiving buffers is granted access to the system bus based on the comparison result, and when the occupancy level of the receiving buffer is higher than the vacancy level of the transmitting buffer, the receiving buffer is granted access to the system bus if the occupancy level of the receiving buffer is increasing, and when the occupancy level of the receiving buffer is not higher than the vacancy level of the transmitting buffer, the transmitting buffer is granted access to the system bus if the vacancy level of the transmitting buffer is increasing.

When the occupancy level of the receiving buffer is higher than the vacancy level of the transmitting buffer, the transmitting buffer is granted access to the system bus if the occupancy level of the receiving buffer is not increasing, and when the occupancy level of the receiving buffer is not higher than the vacancy level of the transmitting buffer, the receiving buffer is granted access to the system bus if the vacancy level of the transmitting buffer is not increasing.

According to another aspect of the present invention, there is provided a network controller having transmitting and receiving buffers, comprising an internal arbiter monitoring the transmitting and receiving buffers, and arbitrating access to a system bus between the transmitting and receiving buffers in response to requests for access to the system bus from the transmitting and receiving buffers. The internal arbiter comprises an emergency mode determination circuit receiving an occupancy level of data in the receiving buffer and a vacancy level of data in the transmitting buffer, determining whether a present operational state corresponds to an emergency mode as a function of the occupancy level and the vacancy level, and outputting an emergency mode signal. A first determination circuit determines if the occupancy level of the receiving buffer is increasing, and outputting a result of the determination as a first signal. A second determination circuit determines if the vacancy level of the transmitting buffer is increasing and outputting a result of the determination as a second signal. A comparing circuit compares the vacancy level of the transmitting buffer with the occupancy level of the receiving buffer and outputting a comparison result. A logic circuit outputs a permission signal to the receiving buffer or the transmitting buffer in response to the first signal, the second signal, and the comparison result, the permission signal granting access to the system bus by one of the transmitting buffer and receiving buffer.

In one embodiment, the emergency mode determination circuit comprises first comparing circuit comparing the occupancy level of the receiving buffer with a threshold occupancy level of the receiving buffer and outputting a first comparison result signal; a second comparing circuit comparing the vacancy level of the transmitting buffer with a threshold vacancy level of the transmitting buffer and outputting a second comparison result signal; and an AND means performing an AND operation on the first and second comparison result signals output by the first and second comparing circuits and outputting the emergency mode signal.

In another embodiment, the first determination circuit comprises a first register storing the occupancy level of the receiving buffer; and a third comparing circuit comparing an output of the first register with the occupancy level of the receiving buffer and outputting the first signal. The second determination circuit comprises a second register storing the vacancy level of the transmitting buffer; and a fourth comparing circuit comparing an output of the second register with the occupancy level of the receiving buffer and outputting the second signal.

BRIEF DESCRIPTION OF THE DRAWINGS

The above aspects and advantages of the present invention will become more apparent by describing in detail a preferred embodiment thereof with reference to the attached drawing in which.

DETAILED DESCRIPTION OF PREFERRED EMBODIMENTS

The present invention will now be described more fully with reference to the accompanying drawings, in which preferred embodiments of the invention are shown. This invention may, however, be embodied in many different forms and should not be construed as being limited to the embodiments set forth herein. Rather, these embodiments are provided so that this disclosure will be thorough and complete and will fully convey the concept of the invention to those skilled in the art. The same reference numerals in different drawings represent the same element.

Figure 2:
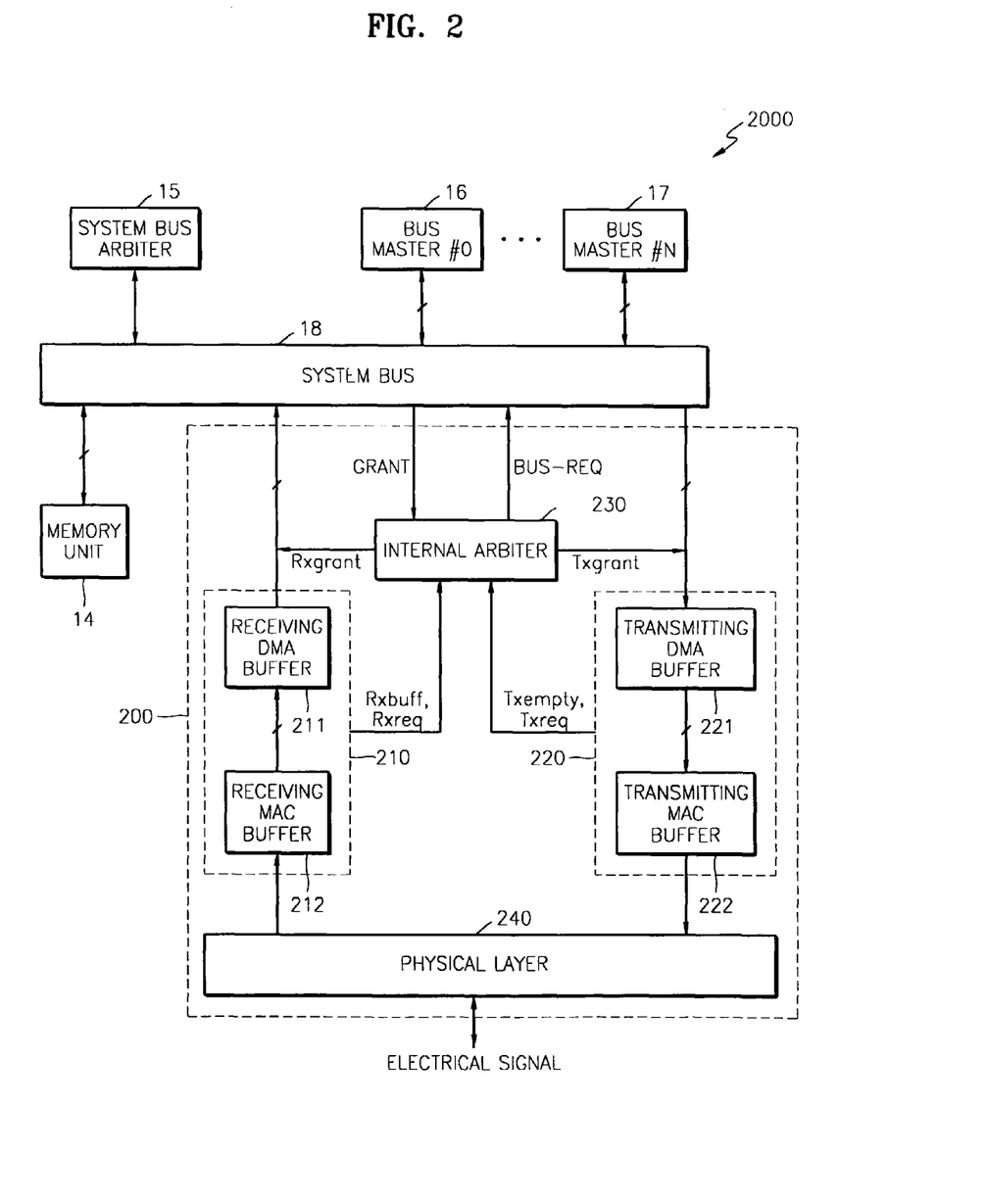
FIG. 2 is a block diagram of a computer system having an Ethernet network controller according to the present invention.

FIG. 2 is a block diagram of a computer system 2000 including an Ethernet network controller 200 according to the present invention. As shown in FIG. 2, the computer system 2000 includes a network controller 200, a memory unit 14, a system bus 18, a plurality of bus Masters 16 and 17, and a system bus arbiter 15. As in the computer system 1000 of FIG. 1, the memory unit 14, the system bus arbiter 15, and the plurality of bus masters 16 and 17 are connected to the system bus 18. Also, although not shown in FIG. 2, a central processing unit (CPU) of the computer system 2000 is connected to the system bus 18.

As described above, elements that are the same as those in FIG. 1 are described with the same numbers and their descriptions will not be repeated. Referring to FIG. 2, unlike the network controller 100 of FIG. 1, in the network controller 200, a receiving direct memory access (DMA) buffer 211 and a receiving media access controller (MAC) 212 comprise one receiving buffer 210 and a transmitting DMA buffer 221 and a transmitting MAC buffer 222 comprise one transmitting buffer 220.

An internal arbiter 230 receives a request signal or signals Rxreq and/or Txreq for access to the system bus 18 from the receiving buffer 210 and/or the transmitting buffer 220 and sends a command requesting access of the system bus 18 to the system bus arbiter 15 via the system bus 18. When access is granted, the internal arbiter 230 receives a grant signal GRANT to permit access to the bus system 18 from the system bus arbiter 15 and sends the grant signal GRANT to the receiving buffer 210 or the transmitting buffer 220 via the system bus arbiter 15.

To receive data, the physical layer 240 receives an analog signal, i.e., electrical signal, corresponding to the data and sends the received analog signal to the receiving buffer 210. Also, to transmit data, the physical layer 240 receives data, which is to be transmitted, from the transmitting buffer 220 and outputs an analog signal, i.e., electrical signal, corresponding to the data to the outside of the network controller 200.

When the network controller 200 is permitted to access to the system bus 18, the internal arbiter 230 determines whether permission to access the system bus 18 is for the receiving buffer 210 or the transmitting buffer 220. The internal arbiter 230 receives information regarding the occupancy level Rxbuff of data in the receiving buffer 210 and the vacancy level Txempty of data in the transmitting buffer 220 and arbitrates access to the system bus 18 between the receiving buffer 210 and the transmitting buffer 220 based on the received information.

The internal arbiter 230 regards the receiving and transmitting buffers 210 and 220 as being a single receiving buffer and a single transmitting buffer, respectively, and arbitrates access to the system bus 18 between these buffers. Therefore, the network controller 200 according to the present invention is capable of minimizing loss of data due to overflow or underflow of a buffer.

Figure 3:
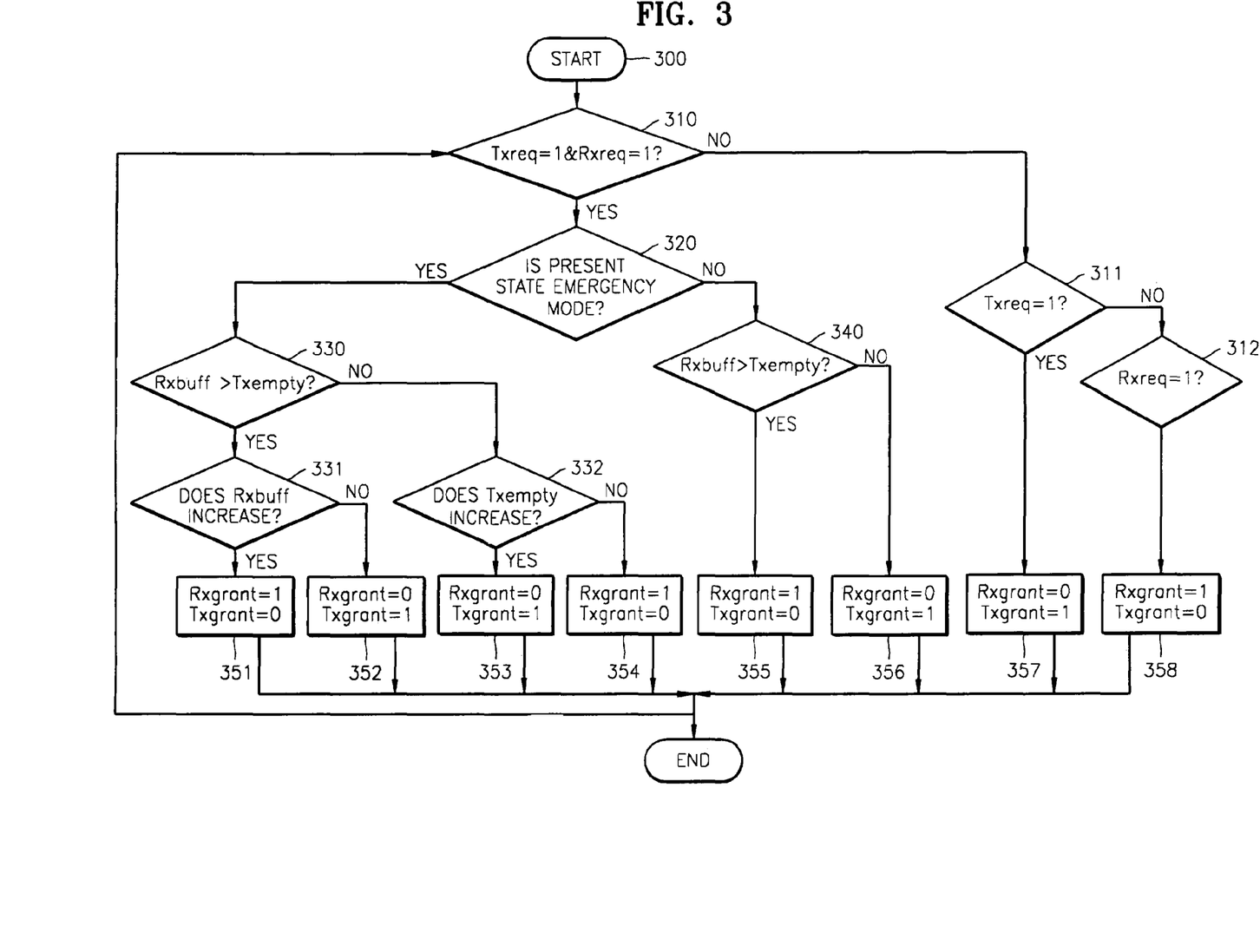
FIG. 3 is a flowchart illustrating a method of controlling a transmitting buffer and a receiving buffer according to the present invention.

FIG. 3 is a flowchart illustrating a method of controlling the transmitting buffer and the receiving buffer according to the present invention. Referring to FIG. 2, in a buffer control method according to the present invention, a plurality of buffers 211 and 212 of a receiving unit, and a plurality of buffers 221 and 222 of a transmitting unit are considered as comprising a single virtual receiving buffer and a single virtual transmitting buffer, i.e., the receiving buffer 210 and the transmitting buffer 220, respectively, and are controlled using the internal arbiter 230.

Referring to FIG. 3, Txreq denotes a command for requesting access to a system bus 18 when the transmitting buffer 220 is empty and Rxreq denotes a command for requesting access to the system bus 18 when the receiving buffer 210 overflows. If Txreq and/or Rxreq are/is active, i.e. "1", this means that there an access request of the system bus 18 is present from the transmitting buffer 220 and/or the receiving buffer 210.

Rxbuff denotes the occupancy level of data in the receiving buffer 210 and Txempty denotes the vacancy level of data in the transmitting buffer 220. Rxgrant denotes a signal for permitting the receiving buffer 210 to access the system bus 18 and Txgrant denotes a signal for permitting the transmitting buffer 220 to access the system bus 18. When Rxgrant or Txgrant is in a logic high state, the internal arbiter 230 allows the receiving buffer 210 or the transmitting buffer 220 to use the system bus 18.

Referring to FIGS. 2 and 3, a method of controlling a buffer according to the present invention will now be described in detail. First, in step 310, when there is a probability that underflow of the transmitting buffer 220 and/or overflow of the receiving buffer 210 are/is caused, the internal arbiter 230 receives a request(s) Txreg and/or Rxreq for use of the system bus 18 from the transmitting buffer 220 and/or the receiving buffer 210 and determines if both the transmitting and receiving buffers 220 and 210 desire access to the system bus 18.

If it is determined in step 310 that both the transmitting and receiving buffers 220 and 210 do not require access to the system bus 18, i.e. both requests Txreg and Rxreq are not active in a logic high state, the internal arbiter 230 permits a buffer which desires to access the system bus 18 to use the system bus 18. That is, if the internal arbiter 230 receives the request Txreq from the transmitting buffer 220, the internal arbiter 230 permits the transmitting buffer 220 to use the system bus 18 in step 357. If the internal arbiter 230 receives the request Rxreq from the receiving buffer 210, the internal arbiter 230 permits the receiving buffer 210 to use the system buffer 18 in step 358.

However, if it is determined in step 310 that both the transmitting and receiving buffers 220 and 210 want to use the system bus 18, i.e., both the requests Txreq and Rxreq are active in a logic high state, the internal arbiter 230 determines whether the present state is in an emergency mode in step 320 and determines which one of the transmitting and receiving buffers 220 and 210 will be allowed to use the system bus 18 according to the result of step 320.

Here, the emergency mode indicates cases where both the receiving and transmitting buffers 210 and 220 request for the use of the system bus 18, the occupancy level Rxbuff of data in the receiving buffer 210 is larger than a threshold occupancy level Rxth thereof, and the vacancy level Txempty of data in the transmitting buffer 220 is larger than a threshold vacancy level Txth thereof.

If the present state is not in the emergency mode, the internal arbiter 230 compares the occupancy level Rxbuff of data in the receiving buffer 210 with the vacancy level Txempty of data in the transmitting buffer 220 in step 340, and determines which one of the receiving and transmitting buffers 210 and 220 will be allowed to use the system bus 18 according to the result of step 340. In other words, if the present state is not in the emergency mode, the internal arbiter 230 permits the receiving buffer 210 to use the system bus 18 when the occupancy level Rxbuff is larger than the vacancy level Txempty, in step 355. Otherwise, the internal arbiter 230 permits the transmitting buffer 220 to use the system bus 18 in step 356.

However, in the emergency mode, the internal arbiter 230 compares the occupancy level Rxbuff with the vacancy level Txempty in step 330, determines whether the occupancy level Rxbuff is increasing in step 331, determines whether the vacancy level Txempty is increasing in step 332, and determines which one of the receiving and transmitting buffers 210 and 220 will use the system bus 18 according to the result of steps 331 and 332.

More specifically, in the emergency mode, the internal arbiter 230 determines whether the occupancy level Rxbuff is increasing when the occupancy level Rxbuff is larger than the vacancy level Txempty, in step 331. If the occupancy level Rxbuff is increasing, the internal arbiter 230 permits the receiving buffer 210 to access the system bus 18 in step 351. If this is not the case, the internal arbiter 230 permits the transmitting buffer 220 to access the system bus 18 in step 352. If the vacancy level Txempty is larger than the occupancy level Rxbuff, the internal arbiter 230 determines whether the vacancy level Txempty is increasing in step 332. When the vacancy level Txempty is increasing, the internal arbiter 230 permits the transmitting buffer 220 to access the system bus 18 in step 353. If this is not the case, the receiving buffer is permitted to access the system bus 18 in step 354.

The method of controlling a buffer according to the present invention includes step 320 of determining whether the present state is an emergency mode because bus priorities should be determined by the internal arbiter depending on whether a danger of underflow or overflow of a transmitting or receiving buffer exists. In general, bus priority is determined referring to the times when data in the transmitting buffer underflows and data in the receiving buffer overflows. However, in the emergency mode, the occupancy level of data in a buffer is considered together with an increase or decrease in the occupancy level.

For instance, even if the occupancy level Rxbuff of data in the receiving buffer is higher than the vacancy level Txempty of the transmitting buffer, the transmitting buffer must have bus priority over the receiving buffer when the occupancy level Rxbuff is decreasing and the vacancy level Txempty is increasing.

Meanwhile, a method of controlling a buffer according to the present invention may be embodied, for example as a program that can be executed by a computer and accomplished by a general digital computer, which can execute the program using a computer readable recording medium.

Figure 4:
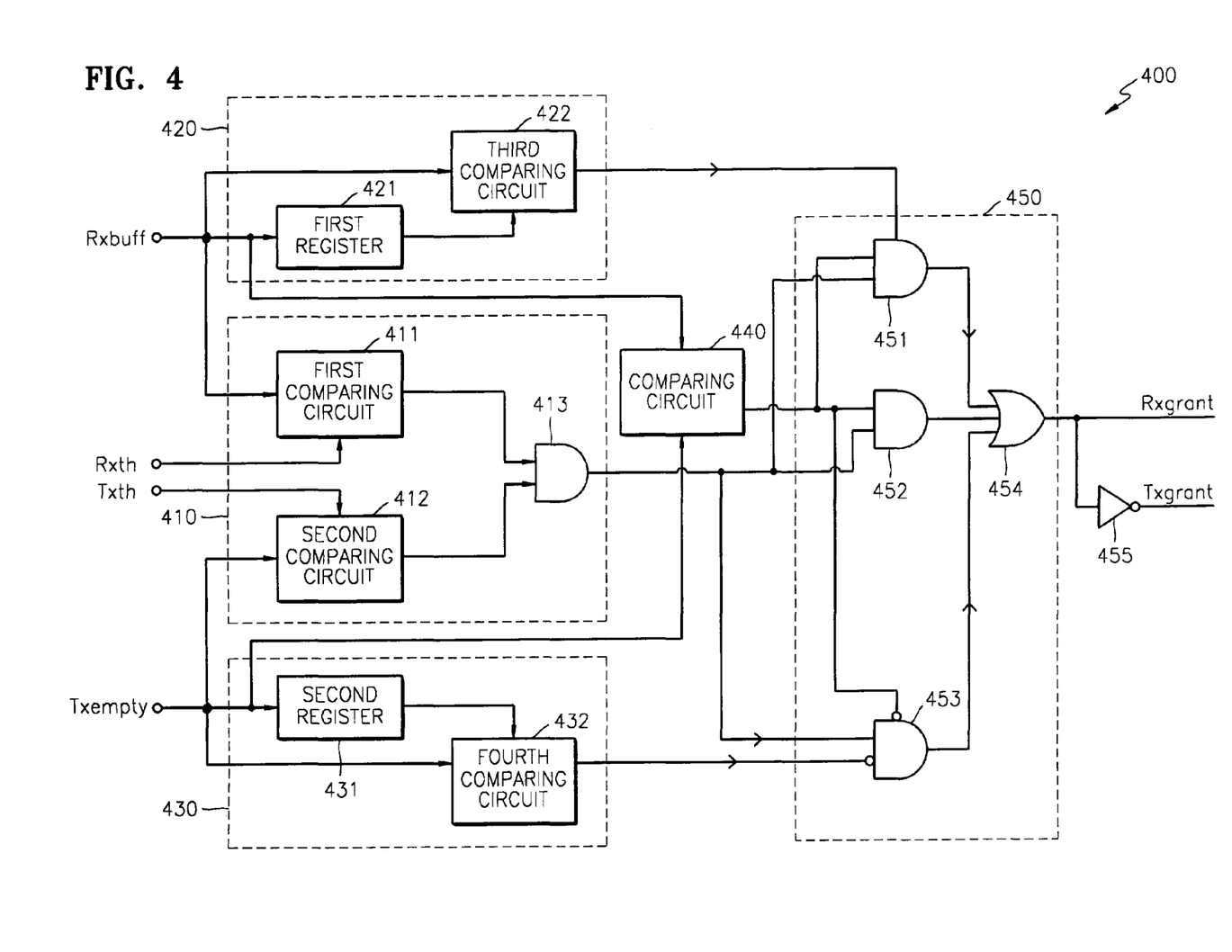
FIG. 4 is a circuit diagram of a portion of an internal arbiter according to a preferred embodiment of the present invention.

FIG. 4 is a circuit diagram of a portion of an internal arbiter 400 according to a preferred embodiment of the present invention. As explained with respect to FIG. 3, FIG. 4 illustrates a circuit diagram of a portion of the internal arbiter 400 when both the receiving unit and the transmitting unit request use of a system bus, i.e., requests Txreq and Rxreq are active in a logic high state.

Referring to FIG. 4, the internal arbiter 400 includes an emergency mode determination circuit 410, a first determination circuit 420, a second determination circuit 430, a comparing circuit 440, and a logic circuit 450.

The emergency mode determination circuit 410 determines whether the present state corresponds to an emergency mode referring to the occupancy level Rxbuff of data in a receiving buffer and the vacancy level Txempty of data in a transmitting buffer, and outputs the determination result. The emergency mode determination circuit 410 includes a first comparing circuit 411 that compares the occupancy level Rxbuff with a predetermined threshold occupancy level Rxth and outputs the comparison result, a second comparing circuit 412 that compares the vacancy level Txempty with a predetermined threshold vacancy level Txth of the transmitting buffer and outputs the comparison result, and an AND means 413 that performs an AND operation on signals output from the first and second comparing circuits 411 and 412. Preferably, the AND means 413 is an AND gate.

The first determination circuit 420 determines whether the occupancy level Rxbuff of the receiving buffer is increasing and outputs result of the determination. The first determination circuit 420 includes a first register 421 that stores the current occupancy level Rxbuff and a third comparing circuit 422 that compares an output of the first register 421, i.e. a previous occupancy level, with the current occupancy level Rxbuff and outputs the comparison result as a first signal.

The second determination circuit 430 determines whether the vacancy level Txempty of the transmitting buffer is increasing and outputs the result of the determination. The second determination circuit 430 includes a second register 431 that stores the current vacancy level Txempty, and a fourth comparing circuit 432 that compares an output of the second register 431, i.e. a previous occupancy level, with the vacancy level Txempty and outputs the comparison result as a second signal.

The comparing circuit 440 compares the vacancy level Txempty with the occupancy level Rxbuff and outputs the comparison result. The logic circuit 450 outputs a permission signal Rxgrant or Txgrant permitting the receiving buffer or the transmitting buffer to access the system bus, in response to the first and second signals and a signal output from the comparing circuit 440.

While this invention has been particularly shown and described with reference to preferred embodiments thereof, it will be understood by those skilled in the art that various changes in form and details may be made therein without departing from the spirit and scope of the invention as defined by the appended claims.

As described above, in a method of controlling transmitting and receiving buffers and a network controller according to the present invention, buffers in the transmitting path and buffers in the receiving path are each treated as a single transmitting buffer and a single receiving buffer, respectively. The occupancy level of data in the receiving buffer, the vacancy level of data in the transmitting buffer, and trends of increasing or decreasing occupancy level and vacancy level are considered in determining bus priority over the transmitting or receiving buffer. Accordingly, it is possible to effectively prevent or reduce underflow of the transmitting buffer and overflow of the receiving buffer, and, at the same time, arbitrate access to memory by the transmitting and receiving buffers.

What is claimed is:

1. A network controller having transmitting and receiving buffers, comprising an internal arbiter monitoring the transmitting and receiving buffers, and arbitrating access to a system bus between the transmitting and receiving buffers in response to requests for access to the system bus from the transmitting and receiving buffers, wherein the internal arbiter comprises:

an emergency mode determination circuit receiving an occupancy level of data in the receiving buffer and a vacancy level of data in the transmitting buffer, determining whether a present operational state corresponds to an emergency mode as a function of the occupancy level and the vacancy level, and outputting an emergency mode signal on an emergency mode signal line, wherein the emergency mode determination circuit comprises:

a first comparing circuit comparing the occupancy level of the receiving buffer with a threshold occupancy level of the receiving buffer and outputting a first comparison result signal;

a second comparing circuit comparing the vacancy level of the transmitting buffer with a threshold vacancy level of the transmitting buffer and outputting a second comparison result signal; and an output circuit that outputs the emergency mode signal in response to the first comparison result signal and the second comparison result signal;

a first determination circuit for determining if the occupancy level of the receiving buffer is increasing, and outputting a result of the determination as a first signal on a first signal line, the first signal indicating whether the occupancy level of the receiving buffer is increasing;

a second determination circuit for determining if the vacancy level of the transmitting buffer is increasing by comparing the vacancy level of the transmitting buffer with a previous transmitting buffer vacancy level that is stored in the second determination circuit and for outputting a result of the determination as a second signal on a second signal line, the second signal indicating whether the vacancy level of the transmitting buffer is increasing;
a comparing circuit comparing the vacancy level of the transmitting buffer with the occupancy level of the receiving buffer and outputting a comparison result signal on a comparison result signal line that indicates which of the occupancy level of the receiving buffer and the vacancy level of the transmitting buffer is greater; and
a logic circuit coupled to the emergency mode signal line, the first signal line, the second signal line, and the comparison result signal line, and outputting a permission signal to the receiving buffer or the transmitting buffer in response to a combination of the emergency mode signal, the first signal indicating whether the occupancy level of the receiving buffer is increasing, the second signal indicating whether the vacancy level of the transmitting buffer is increasing, and the comparison result signal, the permission signal granting access to the system bus to one of the transmitting buffer and receiving buffer.

2. The network controller of claim 1, wherein
the output circuit of the emergency mode determination circuit comprises an AND means, the AND means performing an AND operation on the first and second comparison result signals output by the first and second comparing circuits and outputting the emergency mode signal.

3. The network controller of claim 1, wherein the first determination circuit comprises:
a register storing a previous occupancy level of the receiving buffer; and
a comparing circuit comparing an output of the register with the occupancy level of the receiving buffer and outputting the first signal.

4. The network controller of claim 1, wherein the second determination circuit comprises:
a register storing the previous transmitting buffer vacancy level; and
a comparing circuit comparing an output of the register with the vacancy level of the transmitting buffer and outputting the second signal.

5. A method of arbitrating access to a system bus between a transmitting buffer and a receiving buffer of a network controller, comprising:
receiving requests for access to the system bus from the transmitting buffer and the receiving buffer; and
determining a vacancy level of data in the transmitting buffer and an occupancy level of data in the receiving buffer and granting access to the system bus to one of the transmitting buffer and the receiving buffer, wherein granting access to the system bus comprises:
determining a present operational state as an emergency mode when both the transmitting buffer and receiving buffer request access to the system bus, when the occupancy level of the receiving buffer is higher than a threshold occupancy level of the receiving buffer, and when the vacancy level of the transmitting buffer is higher than a threshold vacancy level of the transmitting buffer, and, in response, generating an emergency mode signal; and
when the operational state is determined as the emergency mode:
comparing the occupancy level of data in the receiving buffer with the vacancy level of data in the transmitting buffer, and, in response, generating a comparison result signal that indicates which of the occupancy level of data in the receiving buffer and the vacancy level of data in the transmitting buffer is greater, and wherein if the comparison result signal indicates that the occupancy level of data in the receiving buffer is greater than the vacancy level of data in the transmitting buffer, then determining if the occupancy level of the receiving buffer is increasing by comparing the occupancy level of the receiving buffer with a previous receiving buffer occupancy level, and, in response, generating a first signal that indicates whether the occupancy level of the receiving buffer is increasing, and wherein if the comparison result signal indicates that the occupancy level of data in the receiving buffer is not greater than the vacancy level of data in the transmitting buffer, then determining if the vacancy level of the transmitting buffer is increasing by comparing the vacancy level of the transmitting buffer with a stored previous transmitting buffer vacancy level, and, in response, generating a second signal that indicates whether the vacancy level of the transmitting buffer is increasing; and
granting access to the system bus to one of the transmitting buffer and the receiving buffer in response to a combination of the emergency mode signal, the first signal indicating whether the occupancy level of the receiving buffer is increasing, the second signal indicating whether the vacancy level of the transmitting buffer is increasing, and the comparison result signal.

6. The method of claim 5, wherein when the present operational state does not correspond to the emergency mode, the occupancy level of the receiving buffer is compared with the vacancy level of the transmitting buffer, and wherein
the receiving buffer is granted access to the system bus when the occupancy level of the receiving buffer is higher than the vacancy level of the transmitting buffer, and the transmitting buffer is granted access to the system bus when the vacancy level of the transmitting buffer is higher than the occupancy level of the receiving buffer.

7. The method of claim 5, wherein when the present operational state corresponds to the emergency mode, the occupancy level of the receiving buffer is compared with the vacancy level of the transmitting buffer, and wherein
when the occupancy level of the receiving buffer is higher than the vacancy level of the transmitting buffer, the receiving buffer is granted access to the system bus if the occupancy level of the receiving buffer is increasing; and
when the occupancy level of the receiving buffer is not higher than the vacancy level of the transmitting buffer, the transmitting buffer is granted access to the system bus if the vacancy level of the transmitting buffer is increasing.

8. The method of claim 7, wherein when the occupancy level of the receiving buffer is higher than the vacancy level of the transmitting buffer, the transmitting buffer is granted access to the system bus if the occupancy level of the receiving buffer is not increasing; and
when the occupancy level of the receiving buffer is not higher than the vacancy level of the transmitting buffer, the receiving buffer is granted access to the system bus if the vacancy level of the transmitting buffer is not increasing.

9. The method of claim 5 further comprising receiving a request for access to the system bus from one of the transmitting and receiving buffers and granting access of the system bus to the one of the transmitting and receiving buffers sending the request.

* * * * *